（12）United States Patent
Zalpuri et al.

(10) Patent No.: US 9,792,344 B2
(45) Date of Patent: Oct. 17, 2017

(54) ASYNCHRONOUS NAMESPACE MAINTENANCE

(71) Applicant: DataDirect Networks, Inc., Chatsworth, CA (US)

(72) Inventors: Naveen Zalpuri, Foster City, CA (US); Joe Bounour, Pleasanton, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 85 days.

(21) Appl. No.: 14/697,224

(22) Filed: Apr. 27, 2015

(65) Prior Publication Data

US 2015/0227603 A1    Aug. 13, 2015

Related U.S. Application Data

(63) Continuation of application No. 13/782,871, filed on Mar. 1, 2013, now Pat. No. 9,020,893.

(51) Int. Cl.
*G06F 17/00* (2006.01)
*G06F 17/30* (2006.01)

(52) U.S. Cl.
CPC .... *G06F 17/30578* (2013.01); *G06F 17/3056* (2013.01); *G06F 17/30091* (2013.01); *G06F 17/30174* (2013.01); *G06F 17/30212* (2013.01); *G06F 17/30525* (2013.01); *G06F 17/30864* (2013.01)

(58) Field of Classification Search
CPC ......... G06F 17/30174; G06F 17/30091; G06F 17/30864; G06F 17/3056; G06F 17/30525; G06F 17/30212; G06F 17/30578

USPC ........................................................ 707/614
See application file for complete search history.

(56) References Cited

U.S. PATENT DOCUMENTS

| | | | |
|---|---|---|---|
| 4,092,732 A | 5/1978 | Ouchi | |
| 4,761,785 A | 8/1988 | Clark et al. | |
| 5,208,813 A | 5/1993 | Stallmo | |
| 5,390,187 A | 2/1995 | Stallmo | |
| 5,504,892 A | 4/1996 | Atsatt et al. | |

(Continued)

OTHER PUBLICATIONS

Zhang, Zheng, et al., "Designing a Robust Namespace for Distributed File Services", RELDIS 2001, New Orleans, LA, Oct. 28-31, 2001, pp. 162-171.*

(Continued)

*Primary Examiner* — Robert Stevens
(74) *Attorney, Agent, or Firm* — SoCal IP Law Group LLP; Mark A. Goldstein

(57) ABSTRACT

Asynchronous namespace maintenance in a distributed replicated data storage system is disclosed. An access device/program serving as a front end to the distributed replicated data storage system updates a batch of updated meta data about stored data items when data items are stored in the distributed replicated data storage system. When the elapsed time since the last batch of data item meta data was stored exceeds a first threshold value or the current batch size exceeds a second threshold value, the access device/program stores the current batch of updated meta data as an object in the distributed replicated data storage system, receiving a batch object identifier for the stored batch of updated meta data, and distributes the batch object identifier to other access devices and/or access programs which retrieve the batch of updated meta data and update their namespaces.

9 Claims, 3 Drawing Sheets

(56) References Cited

U.S. PATENT DOCUMENTS

| | | | |
|---|---|---|---|
| 5,758,153 | A | 5/1998 | Atsatt et al. |
| 6,154,853 | A | 11/2000 | Keden |
| 6,442,659 | B1 | 8/2002 | Blumenau |
| 6,658,439 | B2 | 12/2003 | Karasudani |
| RE39,421 | E | 12/2006 | Stolowitz |
| 7,143,615 | B2 | 12/2006 | Connor et al. |
| 7,529,970 | B2 | 5/2009 | Hartline et al. |
| 7,571,168 | B2* | 8/2009 | Bahar .................. G06F 9/5011 |
| 7,574,527 | B1 | 8/2009 | Tromasov et al. |
| 7,610,307 | B2 | 10/2009 | Havewala et al. |
| 7,657,581 | B2* | 2/2010 | Orenstein ........... G06F 11/2097 |
| | | | 705/51 |
| 7,685,360 | B1* | 3/2010 | Brunnett ............... G06F 3/0608 |
| | | | 360/31 |
| 7,734,643 | B1 | 6/2010 | Waterhouse et al. |
| 7,953,929 | B1 | 5/2011 | Chatterjee et al. |
| 8,010,829 | B1 | 8/2011 | Chatterjee et al. |
| 8,533,155 | B2 | 9/2013 | Pinkey et al. |
| 8,769,105 | B2 | 7/2014 | Lacapra |
| 2001/0016841 | A1 | 8/2001 | Karasudani |
| 2002/0178162 | A1 | 11/2002 | Ulrich et al. |
| 2003/0041097 | A1 | 2/2003 | Tormasov |
| 2003/0115438 | A1 | 6/2003 | Mahalingam et al. |
| 2004/0098383 | A1 | 5/2004 | Tabellion et al. |
| 2004/0107314 | A1 | 6/2004 | Kim et al. |
| 2004/0163020 | A1* | 8/2004 | Sidman ............. H04L 29/12047 |
| | | | 714/100 |
| 2004/0236769 | A1 | 11/2004 | Smith et al. |
| 2005/0216502 | A1 | 9/2005 | Kaura et al. |
| 2006/0143241 | A1* | 6/2006 | Bradshaw ......... G06F 17/30008 |
| 2007/0185902 | A1 | 8/2007 | Messinger et al. |
| 2008/0195651 | A1* | 8/2008 | Rachmiel ............. G06F 21/604 |
| 2009/0106255 | A1 | 4/2009 | Lacapra et al. |
| 2009/0198719 | A1 | 8/2009 | DeWitt |
| 2010/0088317 | A1* | 4/2010 | Bone ................. G06F 17/30144 |
| | | | 707/737 |
| 2010/0180153 | A1 | 7/2010 | Jernigan et al. |
| 2010/0218037 | A1 | 8/2010 | Swartz et al. |
| 2010/0223495 | A1 | 9/2010 | Leppard |
| 2011/0029674 | A1* | 2/2011 | Sidman ............. H04L 29/12047 |
| | | | 709/226 |
| 2011/0137966 | A1* | 6/2011 | Srinivasan .......... H04L 67/1097 |
| | | | 707/828 |
| 2011/0153977 | A1 | 6/2011 | Root et al. |
| 2011/0196900 | A1 | 8/2011 | Drobychev et al. |
| 2011/0219048 | A1 | 9/2011 | Cross et al. |
| 2011/0276622 | A1 | 11/2011 | Knapp et al. |
| 2012/0030736 | A1 | 2/2012 | Resch et al. |
| 2012/0198152 | A1 | 8/2012 | Terry et al. |
| 2012/0311003 | A1* | 12/2012 | Kuznetsov ........ G06F 17/30174 |
| | | | 707/827 |
| 2013/0290295 | A1* | 10/2013 | Soules .............. G06F 17/30283 |
| | | | 707/714 |
| 2013/0346532 | A1 | 12/2013 | D'Amato et al. |
| 2014/0046906 | A1* | 2/2014 | Patiejunas ......... G06F 17/30371 |
| | | | 707/661 |
| 2014/0046908 | A1* | 2/2014 | Patiejunas ......... G06F 17/30073 |
| | | | 707/687 |
| 2014/0046909 | A1* | 2/2014 | Patiejunas ......... G06F 17/30289 |
| | | | 707/687 |
| 2014/0047040 | A1* | 2/2014 | Patiejunas ............... H04L 51/24 |
| | | | 709/206 |
| 2014/0164694 | A1 | 6/2014 | Storer |
| 2014/0188953 | A1 | 7/2014 | Lin et al. |

OTHER PUBLICATIONS

Jian, Ke, et al., "AVSS: An Adaptable Virtual Storage System", CCGRID 2009, Shanghai, China, May 18-21, 2009, pp. 292-299.*

Soares, João, et al., "Combining Mobile and Cloud Storage for Providing Ubiquitous Data Access", Euro-Par 2011, LNCS 6852, Part I, Springer-Verlag, Berlin, Germany, © 2011, pp. 516-527.*

Sinnamohideen, Shafeeq, "Reusing dynamic redistribution to eliminate cross-server operations and maintain semantics while scaling storage systems", PhD Proposal, Computer Science Dept., Carnegie Mellon University, Pittsburgh, PA, May 29, 2007, 17 pages.*

Kang, Sukwoo, et al., "An Approach to Virtual Allocation in Storage Systems", ACM Transactions on Storage, vol. 2, No. 4, Nov. 2006, pp. 371-399.*

Rodrigues et al., "High Availability in DHTs: Erasure Coding vs. Replication", Peer-to-Peer Systems IV 4th International Workshop IPTPS 2005 Published Feb. 2005, accessed May 9, 2013, http://pmg.csail.mit.edu/papers/rodrigo_IPTPS05.pdf, 6 pages.

Huang et al., "Erasure Coding in Windows Azure Storage", Microsoft Corporation, 2012 Usenic best paper, accessed May 9, 2013, http://research.microsoft.com/en-us/um/people/yekhanin/Papers/UsenixATC_2012.pdf, 12 pages.

Gsoedl, "Inside object-based storage", SearchStorage.com, article published Jun. 2012, accessed Oct. 5, 2012, http://searchstorage.techtarget.com/magazineContent/Inside-object-based-storage?vgnextfmt=print, pp. 1-3.

Gsoedl, "Advantages of using an object storage system", SearchStorage.com, article published Jul. 30, 2012, accessed Oct. 5, 2012, http://searchcloudstorage.techtarget.com/tip/Advantages-of-using-an-object-storage-system?vgnextfmt=print, pp. 1-3.

Primmer, "Distributed Object Store Principles of Operation: The Case for Intelligent Storage", White Paper, Published Jul. 2010 by Hitachi Data Systems, total of 20 pages.

Terrace et al., "Object Storage on CRAQ, High-throughput chain replication for read-mostly workloads", In Proc. USENIX Annual Technical Conference, San Diego, CA, Jun. 2009, total of 16 pages.

Taylor, "Object-based storage promises scalability and flexibility for static, unstructured data needs", SearchStorage.co.UK, Apr. 11, 2011, total of 2 pages.

Slack, "Object-based storage for cloud storage: Product assessments", searchCloudProvider.com, published Oct. 26, 2010, 2 total pages.

Slack, "Object storage: Object-based storage devices challenge file systems for unstructured data sets", SearchStorageChannel.com, published Sep. 22, 2010, 2 total pages.

Carns et al., "Object storage semantics for replicated concurrent-writer file systems", journal, Argonne National Laboratory, accessed Oct. 5, 2012, http://www.mcs.anl.gov/events/workshops/iasds10/carns_iasds2010.pdf, 9 pages.

Factor et al., "Object Storage: The Future Building Block for Storage Systems", A Position Paper, IBM Haifa Research Laboratories, pp. 101-105, accessed Oct. 5, 2012, https://www.research.ibm.com/haifa/projects/storage/objectstore/papers/PositionOSD.pdf.

Rackspace, Inc., "CloudFiles Introduction", Jan. 24, 2011, 13 total pages.

DataDirect Networks, Inc., Web Object Scaler, Brochure, Mar. 9, 2010, total of 4 pages.

Connor et al., "Cloud Storage: Adoption, Practice and Deployment", Storage Strategies NOW, Outlook Report, Published Apr. 4, 2011, total of 112 pages.

Berriman, et al., Netapp Raid-DP: Dual-Parity Raid 6 Protection Without Compromise, WP-7005-1006, Oct. 2006, pp. 1-11.

Celeros, Bringing SANity to Storage Costs, RAID White Paper, Jan. 2007, 4 pages.

Chen et al., RAID: High-Performance, Reliable Secondary Storage, AMC Computing Surveys, vol. 26, No. 2, Jun. 1994, pp. 145-185.

DataDirect Networks, DataDirect Networks S2A9550: High-Performance, Resilient Storage for High-Performance Computing (HPC), White Paper, Sep. 2007, pp. 1-12.

DataDirect Networks, Best Practices: Enterprise SATA Deployment with High Performance and Reliability, White Paper, Dec. 2007, pp. 1-12.

EMC, EMC CLARiiON Raid 6 Technology, White Paper, Jul. 2007, pp. 1-14.

MPSTOR, RAID 50 Interleave, White Paper, Xtore Extreme Storage, Nov. 2006, pp. 1-13.

Patterson, et al., A Case for Redundant Arrays of Inexpensive Disks (RAID), Computer Science Division, Department of Electrical Engineering and Computer Sciences, pp. 1-25.

(56) References Cited

OTHER PUBLICATIONS

Pivot3, Pivot3 RAIGE Storage Cluster, White Paper, Technology Overview, Feb. 2007, pp. 1-18.
Storage, Best Storage Products of 2007, issued Feb. 2008, accessed on Apr. 22, 2008, http://searchstorage.techtarget.com/magazinePrintFriendly/0,296905,sid5_gci1299110,00.html, 17 pages.
WinchesterSystems, Technology Update White Paper "Enterprise RAID 6", May 4, 2006, pp. 1-14.
Du, et al., Experiences Building and Object-Based Storage System Based on the OSD T-10 Standard, DTC Intellient Storage Consortium, University of Minnesota, 2006, pp. 1-11.
Moore, et al., Storage Resource Broker Global Data Grids, San Diego Supercomputer Center, 2006, pp. 1-12.
Devulapalli, et al., Integrating Parallel File Systems with Object-Based Storage Devices, Ohio Supercomputer Center, pp. 1-10.
Smolik, An Opject-Oriented File System—An Example of Using the Class Hierarchy Framework Concept, Department of Computer Sciences, University of Missouri—Rolla, pp. 33-53.
Olson, et al., Secure Capabilities for a Petabyte-Scale object-Based Distributed File System, Storage System Research Center, Computer Science Department, University of California, Santa Cruz, pp. 64-73.
Marsden et al., improving the Usability of the Hierarchical File System, Department of Computer Science, University of Cape Town and University of Stirling, Proceedings of SAICSIT 2003, pp. 122-129.
Gaffey, SGI's Cluster File System—CXFS, File Systems Engineering, Apr. 9, 2000, slides 1-56.
Foster, Global data Services, Developing Data-Intensive Applications Using Globus Software, Computation Institute Argonne National Lab & University of Chicago, slides 1-114.
Pollack et al., Efficient Access Control for Distributed Hierarchical File Systems, University of California, Santa Cruz, slides 1-9.
Pollack et al., Efficient Access Control for Distributed Hierarchical File Systems, University of California, Santa Cruz, 2005, Journal, pp. 101-108.
Shinkai et al., Alternative Implementations of Cluster File Systems, MMS Conference, Mar. 2000, slides 1-16.
Rogers et al., z/OS Distributed File Service zSeries File System Implementation z/OS V1R11, Oct. 2009, Redbooks, IBM, International Technical Support Organization, Draft Document, Nov. 24, 2009, pp. 1-458.
Pike et al., The Styx Architecture for Distributed Systems, Computing Science Research Center, Bell Labs Technical Journal, vol. 4, No. 2, Apr.-Jun. 1999, pp. 1-11.
Welch et al., Object-Based Cluster Storage Systems, Panasas, Inc., May 25, 2006, slides 1-104.
Zang et al., "Designing a Robust Namespace of Distributed File Services", RELDIS, New Orleans, LA, Oct. 18-31, 2001, pp. 162-171.
Belaramani, Nalini et al., "PADS: A Policy Architecture for Distributed Storage Systems", NSDI '09, USENIX, Ass'n Berkeley, CA, 2009, pp. 59-73.
Soares et al., "Combining Mobile and Cloud Storage for Providing Ubiquitous Data Access", Euro=Par 2011, LNCS 6852, Part 1, Springer-Verlag, Berlin, 2007, pp. 516-527.
More et al., "Multigating Risk of Data Loss in Preservation Environments", MSST '05, Monterey, CA Apr. 11-14, 2005, pp. 39-48.
Zheng et al., "Design a Cloud Storage Platform for Pervasive Computing Environments", Cluster Computing, vol. 13, Issue 2, Springer-Verlag, Berlin, Jun. 2010, pp. 141-151.
Peek et al., "EnsemBlue: INtegrating Distributed Storage and Consumer Electronics", OSDI '06, USENIX Ass'n, Berkley, CA, 2006, pp. 219-232.
Weil et al., "Ceph: A Scalable, High-Performance Distributed File System", OSDI '06, USENIX Ass'n Berkeley, CA 2006, pp. 307-320.
Jain et al., "AVSS: An Adaptable Virtual Storage System", CCGRID 2009, Shanghai, China, May 18-21, 2009, pp. 292-299.

\* cited by examiner

ASYNCHRONOUS NAMESPACE MAINTENANCE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from non-provisional patent application Ser. No. 13/782,871 filed Mar. 1, 2013 entitled, "ASYNCHRONOUS NAMESPACE MAINTENANCE" issued as U.S. Pat. No. 9,020,893 on Apr. 28, 2015.

BACKGROUND

Field

This disclosure relates to data stored in a distributed replicated data storage system and an improved method for maintaining namespace data across access devices to a distributed replicated data storage system.

Description of the Related Art

A file system is used to store and organize computer data stored as electronic files. File systems allow files to be found, read, deleted, and otherwise accessed. File systems store files on one or more storage devices. File systems store files on storage media such as hard disk drives and silicon storage devices. In contrast, the system described herein involves data items stored as a plurality of objects in an object storage system. Object storage systems may provide a simpler instruction set and improved storage and access efficiencies compared to a traditional file system. Applications may store large numbers data items, for example documents, images, audio, videos, medical records, scientific data and other data items as a plurality of objects using an object storage system. Various applications may store large numbers of data items as objects using a distributed data storage system in which data is stored in at least two locations. Information about the data items stored among storage devices in multiple locations in the distributed data storage system must be maintained so that the stored data items may be accessible and accessed when requested by an upper level file system.

DETAILED DESCRIPTION

Environment

Figure 1:
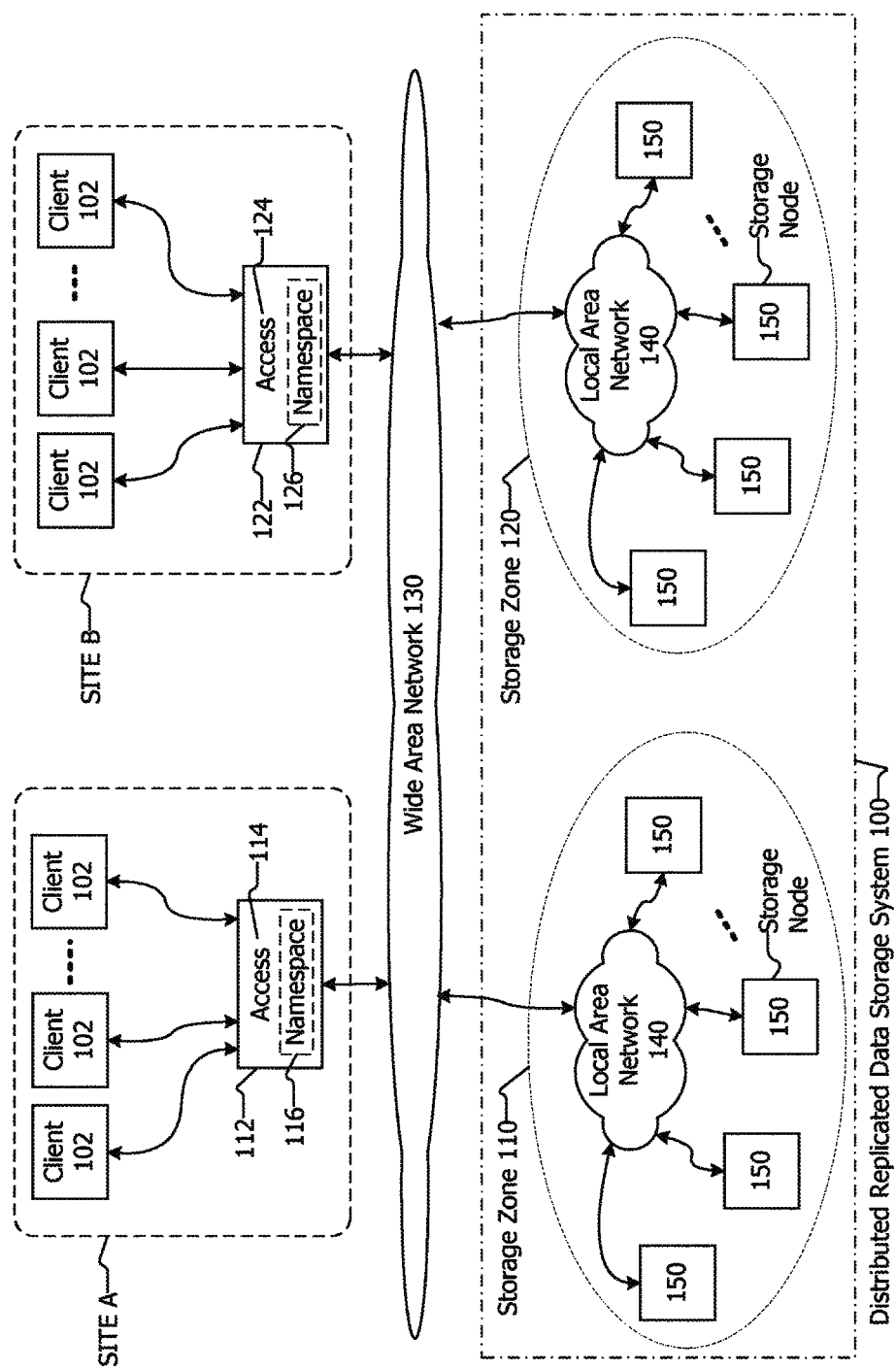
FIG. 1 is a block diagram of a distributed replicated data storage system.

FIG. 1 is a block diagram of a distributed replicated data storage system 100. The distributed replicated data storage system 100 includes at least two storage zones. The distributed replicated data storage system 100 includes multiple storage zones that are independent of one another and that may be geographically dispersed and are in a peer-to-peer configuration. In the example shown, the distributed replicated data storage system 100 includes two storage zones, first storage zone 110 and second storage zone 120.

The storage zones 110 and 120 are separated geographically. Storage zone 110 may be at or near Site A and storage zone 120 may be at or near Site B. Although only two storage zones 110 and 120 at two sites Site A and Site B are shown, the system typically includes multiple storage zones at multiple geographic location sites. In addition, the system may include multiple storage zones at a site that clients access via one or more access devices.

The storage zones communicate with each other and share objects over a wide area network. In the example shown, the storage zones 110 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The term data as used herein includes a bit, byte, word, block, stripe or other unit of information. As used herein, the term data is inclusive of entire computer readable files or portions of a computer readable file. The data may include or represent text, numbers, data (for example, financial data, scientific data, medical data, consumer data, research data), images, photographs, graphics, audio, video, computer programs, computer source code, computer object code, executable computer code, and/or a combination of these and similar information. A data item refers to a single computer readable file. A data item may be stored as a plurality of objects. Objects may include a plurality of sub-objects which are in and of themselves objects.

Many data intensive applications store a large quantity of data, these applications include scientific applications, newspaper and magazine websites (for example, nytimes.com and life.com), health care providers, scientific lab data capturing and analysis programs, video and film creation software, and consumer web based applications such as social networking websites (for example, FACEBOOK®), photo sharing websites (for example, FLICKR®), video sharing websites (for example, YOUTUBE®) and music distribution websites (for example, ITUNES®).

Clients 102 of the distributed replicated data storage system 100 include computing devices of various kinds that may run or otherwise execute data intensive applications. Clients 102 store data items on the distributed replicated data storage system 100. The client may issue data storage requests to the distributed replicated data storage system 100 using a client application program and/or an application program interface made available by an upper level file system on the client. The clients 102 issue file storage and access requests to the distributed replicated data storage system 100 via an access program running on a server or network device between the clients 102 and the distributed replicated data storage system 100.

The access program or an access device running an access program 112/122 provides an interface between the clients 102 and the distributed replicated data storage system 100. The access devices and access programs act as front ends or interfaces to the storage zones in the distributed replicated data storage system. The access program 114/124 may run on a server 112/122 or other computing device or specialized network capable computing device such as, for example, a gateway. The access program 114/124 may provide support for upper level network file systems such as, for example, well known file system such as NFS (network file system including but not limited to NFSv2, NFSv3, NFSv4 and WebNFS) and CIFS (Common Internet File System, also known as Server Message Block (SMB) which includes the Samba implementation), or a proprietary file system.

The access program 114/124 maintains information about data items stored in the distributed replicated data storage system 100 by maintaining a namespace 116/126 of information about the stored files and the corresponding stored data objects. Because the data storage system provides for replication and provides clients the ability to access data items from any accessible storage zone, the access program must keep an accurate listing of data items stored in the distributed replicated data storage system 100. Whenever a data item is stored by a client 102 at Site A in storage zone 110 of the distributed replicated data storage system 100, the namespace 116 at Site A is updated. Concurrently or shortly thereafter, the namespace 126 at Site B must be updated to reflect changes in the namespace in Site A. How this is achieved is described below.

Figure 2:
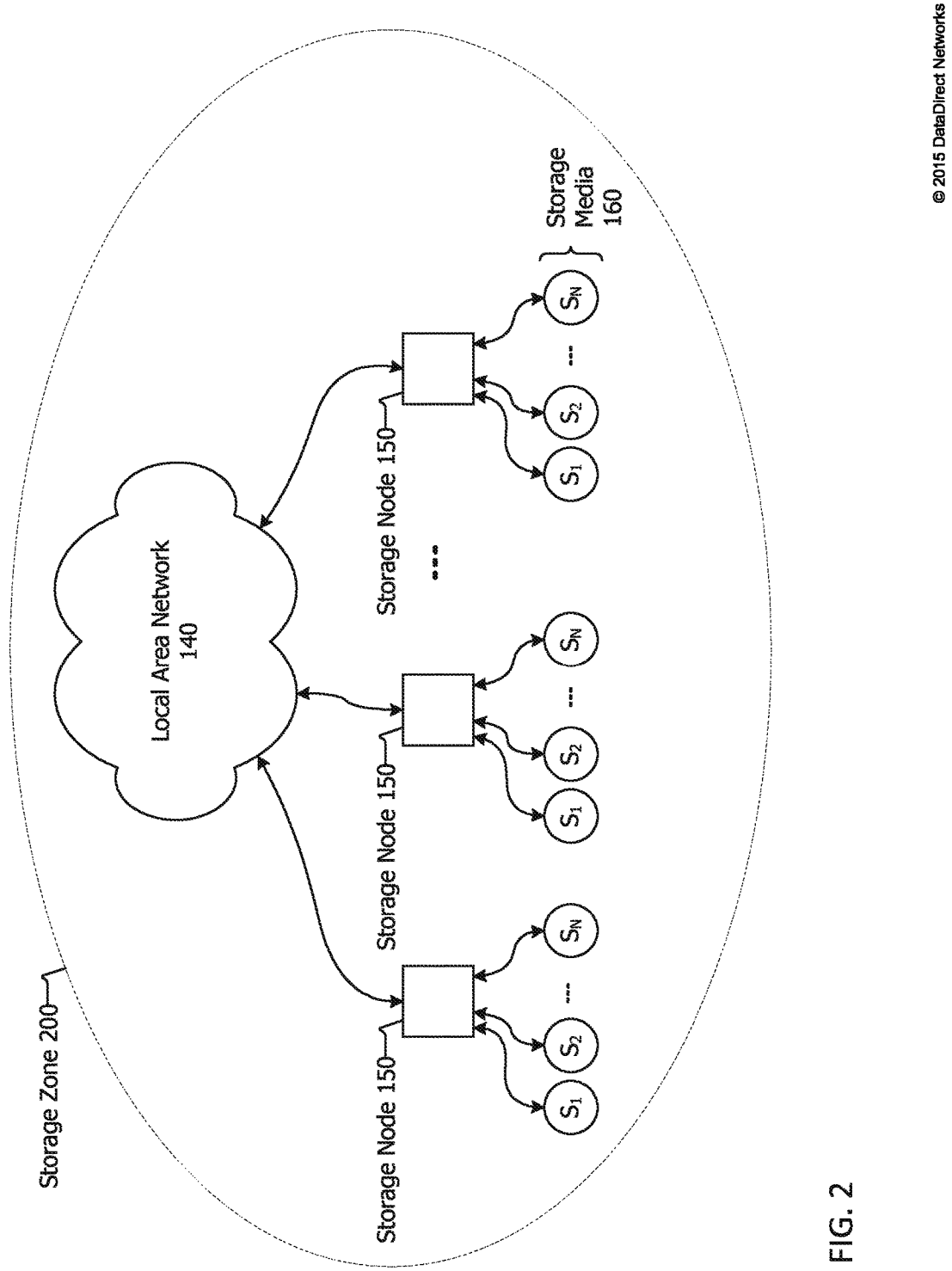
FIG. 2 is a block diagram of a storage zone included in a distributed replicated data storage system.

FIG. 2 is a block diagram of a storage zone 200 included in distributed replicated data storage system 100. The storage zones 110 and 120 shown in FIG. 1 are examples of storage zone 200. The storage nodes 150 within a storage zone 200 may be connected via a local area network 140 by wire lines, optical fiber cables, wireless communication connections, and others, and may be a combination of these. The local area network 140 may include one or more networking devices such as routers, hubs, switches and the like.

Referring again to FIG. 1, one node in one of the storage zones may include an object management system and/or application program that automatically replicates objects in one zone according to policies specified for the objects. A storage node or controller in the storage zones may maintain or store a list of the replication policies for the distributed replicated data storage system 100 and available to the clients 102.

The storage zones 110 and 120 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some actions are performed by a controller or computing device, and others by other controllers or computing devices within a storage zone.

A computing device as used herein refers to any device with a processor, memory and a storage device that may execute instructions such as software including, but not limited to, server computers, personal computers, portable computers, and laptop computers. The computing devices may run an operating system, including, for example, versions of the Linux, Unix, MS-DOS, Microsoft Windows, Solaris, Symbian, Android, Chrome, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 200 includes a plurality of storage nodes 150 which include a plurality of storage media 160. Each of the storage nodes 150 may include one or more server computers. Each of the storage nodes 150 may be an independent network attached storage (NAS) device or system. The term "storage media" is used herein to refer to any configuration of hard disk drives, solid-states drives, silicon storage devices, magnetic tape, or other similar storage media. Hard disk drives and/or other storage media 160 may be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 500 Mbytes, 1 terabyte and 2 terabytes. Example hard disk drive specifications include Serial Attached Small Computer System Interface (SAS), Serial Advanced Technology Attachment (SATA), and others. An example storage node may include 16 one terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes.

The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of standards, including, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, etc. network connections and may have an equal number of network interfaces to achieve this.

The techniques discussed herein are described with regard to storage media including, but not limited to, hard disk drives and solid-state drives. The techniques may be implemented with other readable and writable storage media.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks and tape, flash memory, and optical disks such as CDs, DVDs and BLU-RAY® discs.

According to the systems and methods described herein, the distributed replicated data storage system 100 partitions data items into smaller portions and stores the data items as multiple objects among multiple storage media 160 in a storage node 150. Data items may be partitioned into smaller portions referred to as objects and stored among multiple storage nodes 150 in a storage zone. In one embodiment each object includes a storage policy identifier and a data portion. The object including its constituent data portion is stored among storage nodes and storage zones according to the storage policy specified by the storage policy identifier included in the object.

Various policies may be maintained and distributed or known to the nodes in all zones in the distributed storage system. Policies define the replication and placement of data objects in the data storage system. Example policies include, full distribution, single copy, single copy to a specific zone, copy to all zones but a specified zone, and others. The policies may be stored on and distributed from a client 102 to the distributed replicated storage system 100 to all nodes in the storage system. A character (e.g., A, B, C, etc.) or number (e.g., 0, 1, 2, etc.) or combination of one or more characters and numbers (e.g., A1, AAA, A2, BC3, etc.) or other scheme may be associated with and used to identify each of the policies. The client 102 of the storage system 100 may be a computing device such as, for example, a personal computer, tablet, mobile phone, workstation or server.

Referring again to FIG. 1, the wide area network 130 may connect geographically separated storage zones and geographically connected client sites, such as, for example Site A and Site B. Each of the storage zones includes a local area network 140.

In a distributed replicated data storage system, data items are replicated among some or all storage zones such that copies of stored data items are available as needed by the users of the system. When data items are stored, the distributed replicated data storage system maintains information about the location of the data items and their constituent objects. A single identifier for the data items is maintained by the access program 114/124 when a data item is stored using the distributed replicated data storage system 100. The access program 114/124 creates and maintains a namespace 114/124 for the data items. The namespace includes meta data that provides information about the data items. Stated conversely, the access program uses the meta data for stored data items to create a namespace for the stored data items. The namespace is used to keep track of where data items are stored including where different or multiple versions of the data items are stored. The meta data includes some of the following: data item name, data item identifier, data item version, data item type, data item size, data item creation date, data item storage date, data item modification date, data item owner, data item author, data item object identifier, data item object kind, flags, parent/predecessor data item identifier, storage policy identifier, and other similar information about the data item and its location.

According to the systems and methods described herein, regardless of whether the data items are replicated synchronously, that is, completed before the write operation is acknowledged or asynchronously, that is, the replicas may be written before, after or during the write of the first copy, or a combination of each, the metadata or namespace information for the data items is distributed asynchronously.

In traditional replicated data storage systems, whenever a data item is stored, information about the stored item may be processed and transmitted among all devices or subsystems in the storage system. This may occur prior to the distribution and replication of the data item so that additional users accessing the data item at a second subsystem or device will be alerted to or provided the newer version of the data item at a first subsystem or device. When many data items are being stored the resulting number of updates of information about the newly written data items grows. This increases traffic between the storage system access devices. Importantly, when data item information is sent, the information must be processed prior to transmission and then processed upon receipt. This results in processing overhead on both the sending and receiving access devices to the storage system.

In the example shown in FIG. 1, when a data item is stored by a client 102 in Site A through access program 114 in storage zone 110, information about the stored item is stored in the namespace 116. As this is a distributed replicated file system, the information about the stored item must be processed and transmitted to other namespaces at other access devices, in this example namespace 126 of access device 122 at Site B. This may occur prior to the distribution and replication of the data item so that additional users accessing the data item at Site B will be alerted to or provided the newer version of the data item stored at Site A. When many data items are being stored by clients 102 at Site A, the resulting amount of updated information about the newly written data items grows. This increases traffic from access program 114 regarding namespace 116 at Site A to update the namespace 126 of access program 124 at site B. Importantly, historically, when data item information is sent, the information from namespace 116 would have to be processed by the access program 114 at access device 112 prior to transmission to the access device 122 at site B. And the access program 124 at Site B would need to process the incoming transmissions to update the namespace 126 at Site B. The updating the namespace at remote or other sites based on changes made at a first site was historically done seriatim. That is, whenever a data item was stored, the namespace would be updated and the remote or other namespaces would be synchronized; this would occur on a per data item basis in series. As such, this results in processing overhead on both access devices 112 and 122 upon the sending and receiving of each namespace update involving the storage system.

To reduce the processing overhead described in the prior two paragraphs, the systems and methods described herein batch data item information for namespace updates in a group. As such, the namespace updates are performed asynchronously with respect to when actual file storage is performed. In addition, instead of transmitting the batched update to the remote other sites, according to the systems and methods described herein, the batch update is achieved using the object storage mechanisms already included in the underlying storage system. In this way, the namespace is updated among all portions of the storage system without using special processing while reducing the processing overhead at access devices required of earlier storage systems.

Description of Processes

The asynchronous namespace maintenance method described herein stores batches of namespace updates and distributes the batches using the object storage mechanism included in the distributed replicated data storage system. The namespace update batches are stored and distributed using the distributed replicated data storage system when a system defined size of the batch is met or exceeded, when an elapsed time since last namespace batch update has occurred is met or exceeded, and/or a combination of these. In this way, the namespaces are updated asynchronously with respect to when actual file storage is performed. A single object ID is received by the access program when the namespace update batch is stored, and the access program merely provides the namespace update batch's object ID to other access devices. The system allows for the maintenance and spreading of namespace information in an accumulated batch of meta data as an object in the distributed replicated storage system. The batch as object update method described herein reduces overhead in the form of processing time, processing throughput, network traffic and the like. The updating and spreading of the namespace batch updates as objects among zones is performed so that the timeliness and durability of the namespace is ensured while overhead incurred in namespace updates at the access devices is reduced.

Figure 3:
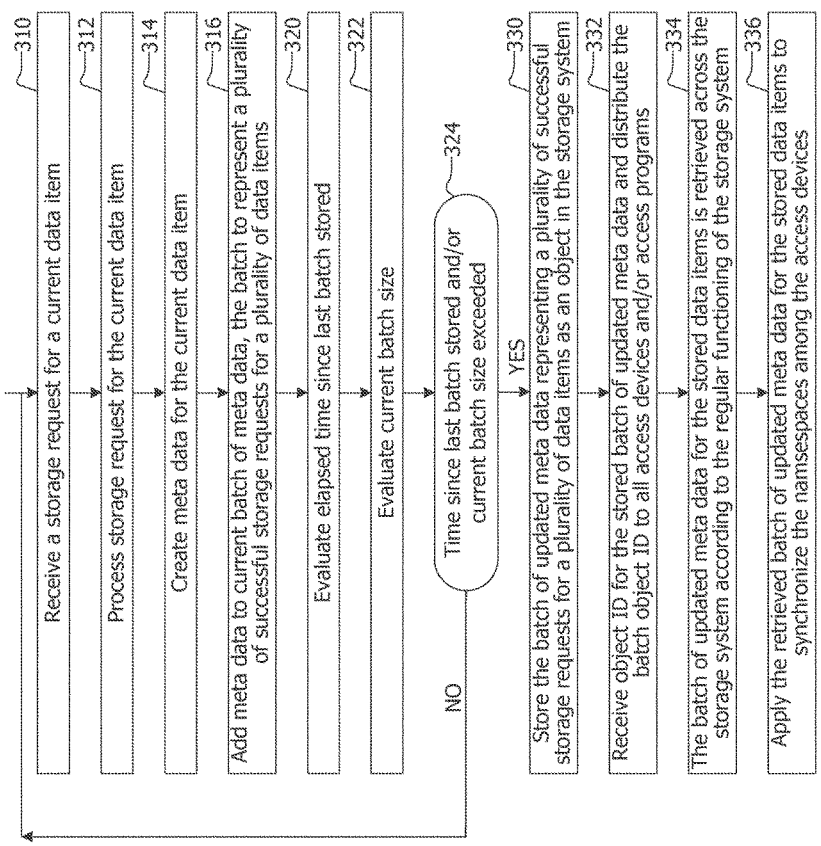
FIG. 3 is a flow chart of the actions taken to maintain namespace information in access devices to a distributed replicated data storage system.

Referring now to FIG. 3, there is shown a flow chart of the actions taken to maintain namespace information about items stored in a distributed replicated data storage system. The namespace information is stored in or by access programs and access devices that provide interfaces or front ends to a distributed replicated data storage system. The namespace information includes meta data for data items stored by the underlying distributed replicated data storage system. The system, namely the access program or access device, receives a storage request for a current data item, as shown in block 310. The storage request may be a request to write, store, put, amend, append, or modify or otherwise store a new or modified or replacement data item, depending on the particular storage system feature set. The system receives this request from a client device such as client 102 shown in FIG. 1. The system processes the storage request for the current data item, as shown in block 312. The processing includes forwarding the storage request to the distributed replicated data storage system and receiving a stored data item identifier. The system creates meta data for the current data item, as shown in block 314. The meta data includes the stored data item identifier. The system adds (that is, appends) the meta data for the current data item to a current batch of meta data, the batch to represent a plurality of successful storage requests for a plurality of data items, as shown in block 316.

The system evaluates the elapsed time since last batch of meta data was stored, as shown in block 320. This can be achieved using an access device hardware clock, software counter or other timing or counting technique. The system evaluates the current batch size, as shown in block 322. The current batch size may be a measure of the amount of data in bytes, kilobytes, etc. of the current batch of meta data, or the current batch size may reflect the number of data items (a simple sum or count) for which meta data is included in the current batch of meta data. The system then determines whether the elapsed time since the last batch of meta data was stored and distributed across the distributed replicated data storage system has been exceeded, and/or whether the current batch size of the current batch of meta data has been exceeded, as shown in block 324. The system may refer to stored thresholds specifying the maximum elapsed time between batch updates and the maximum batch size. These thresholds may be system defined and/or user customizable.

In one version of the system, when the elapsed time since the last batch of meta data was stored and distributed across the distributed replicated data storage system has been exceeded, or when the current batch size of the current batch of meta data has been exceeded, as shown in block 324, the current batch of updated meta data representing a plurality of successful storage requests for a plurality of data items is stored as an object in the distributed replicated storage system, as shown in block 330. This causes the current batch of updated meta data to be distributed and replicated across the distributed replicated data storage system as if it were any other object in the distributed replicated data storage system. The distribution and replication may be achieved according to a storage policy identifier included with an access program storage request to store the current batch of updated meta data to the distributed replicated data storage system. The system receives an object ID for the stored batch of updated meta data and distributes the batch object ID to all access devices and/or access programs, as shown in block 332. The batch of updated meta data for stored data items is retrieved by access devices across the storage system according to the regular functioning of the storage system, as shown in block 334. This causes other and remote access programs to update their namespaces by retrieving the object associated with the batch object ID and accessing the updated meta data in the retrieved batch object. In this way, the retrieved batch of updated meta data for the stored data items is applied by access programs to synchronize the namespaces among the access programs and/or access devices that access the storage system, as shown in block 336.

In another version of the system both the elapsed time and size of the batch must be exceeded before the batch of updated meta data is distributed across the data storage system. In another version of the system, there may be a sliding scale or other calculation such that a combination of more time and smaller size, or less time and larger size may be included in a determination of when to distribute the batch of updated meta data across the data storage system.

When neither the elapsed time since the last batch of meta data was stored and distributed across the distributed replicated data storage system has been exceeded, nor the current batch size of the current batch of meta data has been exceeded, as shown in block 324, the flow of actions continues at block 310 when a storage request for a next, current data item is received.

To achieve the methods shown and described regarding FIG. 3, additional and fewer steps may be taken, and the steps as shown may be combined or further refined to achieve the methods described herein. In addition, the actions shown and described regarding FIG. 3 may be taken in parallel and may be taken concurrently with multiple batches of updated metadata.

The method of storing an object by the distributed replicated data storage system described above and referenced in FIG. 3 may be performed by and managed by a node included in a zone in a distributed replicated data storage system in which the independent nodes communicate with each other. In another embodiment, the object storage methods of the distributed replicated data storage system may be performed by and managed by an independent computing device or controller in a storage zone in a distributed replicated data storage system. In another embodiment, the object storage methods of the distributed replicated data storage system may be performed and managed by a client device coupled with the distributed replicated data storage system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An access device including an access program, the access device coupled with and serving as a front end to a distributed replicated storage system, the access program comprising instructions which when executed cause the access device to perform actions including:
   updating a current batch of updated meta data about stored data items when the access device stores data items in the distributed replicated data storage system, the updating including appending meta data about stored data items to an existing batch of updated meta data about earlier stored data items to create the current batch of updated meta data about stored data items;
   when an elapsed time since a last batch of data item meta data was stored exceeds a first threshold value or when a current batch size of the current batch of updated meta data exceeds a second threshold value,
      storing the current batch of updated meta data as an object in the distributed replicated data storage system, including receiving a batch object identifier for the stored batch of updated meta data,
      distributing the batch object identifier to other access devices and/or access programs causing the other access devices and/or access programs to retrieve the batch of updated meta data from the distributed replicated data storage system and update their namespaces.

2. The system of claim 1 wherein the updating comprises:
   receiving a plurality of storage requests for data items from clients,
   processing the storage requests for the data items including forwarding the storage requests to the distributed replicated data storage system and receiving corresponding stored data item identifiers,
   wherein the updated meta data includes the stored data item identifiers.

3. The system of claim 1 wherein the access program includes additional instructions which when executed cause the access device to perform further actions including:
   determining whether an elapsed time since a last batch of data item meta data was stored exceeds a first threshold value,
   determining whether a current batch size of the current batch of data item meta data exceeds a second threshold value.

4. The system of claim 1 wherein the access devices are server computers and/or gateways.

5. The system of claim 1 wherein the distributing the batch object identifier causes the access programs on the access devices to synchronize the namespaces among the access devices.

6. The system of claim 1 wherein the distributed replicated storage system includes at least two storage zones, each storage zone includes a plurality of storage nodes, and each storage node includes a plurality of storage devices.

7. The system of claim 6 wherein each access device is associated with and acts as a front end to at least one storage zone.

8. The system of claim 6 wherein the storage devices are selected from the group including hard disk drives and solid state storage devices.

9. The system of claim 1 wherein the meta data includes at least three selected from the group including: object identifier, data item name, data item version, data item type, data item size, data item creation date, data item storage date, data item modification date, data item owner, data item author, data item object kind, flags, parent/predecessor data item identifier, storage policy identifier.

* * * * *